(12) United States Patent
Takahashi et al.

(10) Patent No.: US 7,879,466 B2
(45) Date of Patent: Feb. 1, 2011

(54) PERPENDICULAR MAGNETIC RECORDING MEDIUM, AND PERPENDICULAR MAGNETIC RECORDING AND REPRODUCING APPARATUS

(75) Inventors: Migaku Takahashi, Sendai (JP); Masahiro Oka, Yokohama (JP); Akira Kikitsu, Yokohama (JP)

(73) Assignees: Tohoku University, Miyagi-ken (JP); Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 636 days.

(21) Appl. No.: 11/886,635

(22) PCT Filed: Mar. 29, 2006

(86) PCT No.: PCT/JP2006/307178

§ 371 (c)(1),
(2), (4) Date: Sep. 18, 2007

(87) PCT Pub. No.: WO2006/107068

PCT Pub. Date: Oct. 12, 2006

(65) Prior Publication Data

US 2009/0034119 A1 Feb. 5, 2009

Related U.S. Application Data

(60) Provisional application No. 60/669,893, filed on Apr. 11, 2005.

(30) Foreign Application Priority Data

Mar. 30, 2005 (JP) .............................. 2005-100020

(51) Int. Cl.
*G11B 5/65* (2006.01)
*G11B 5/667* (2006.01)

(52) U.S. Cl. .................... 428/829; 428/828; 428/836.1; 360/135

(58) Field of Classification Search ...................... None
See application file for complete search history.

(56) References Cited

U.S. PATENT DOCUMENTS 4,416,943 A 11/1983 Saito (Continued)

FOREIGN PATENT DOCUMENTS

JP 57045208 A 3/1982

(Continued)

OTHER PUBLICATIONS

Abstract of WO 2004/019322 A1 (Apr. 2004).*

*Primary Examiner* — Kevin M Bernatz
(74) *Attorney, Agent, or Firm* — Sughrue Mion, PLLC

(57) ABSTRACT

The invention provides a perpendicular recording medium with high recording density, and a magnetic recording and reproducing apparatus, by improving the function of magnetic anisotropy of a soft magnetic underlayer. The perpendicular recording medium has at least a soft magnetic underlayer and a perpendicular magnetic recording layer on a non-magnetic substrate, wherein when $Ku\perp$ ($erg/cm^3$) is defined as a perpendicular magnetic anisotropic energy, and Ms ($emu/cm^3$) is defined as a saturation magnetization of the soft magnetic underlayer, $Ku\perp$ of the soft magnetic underlayer has a negative value and $Ku\perp < -2\pi Ms^2$. As a result, the easy axis of a magnetization of a soft magnetic underlayer is oriented strongly in the substrate surface plane, which is effective to suppress the WATE phenomena and spike noise.

8 Claims, 5 Drawing Sheets

U.S. PATENT DOCUMENTS

| | | | |
|---|---|---|---|
| 6,841,259 B1 * | 1/2005 | Takahashi et al. | 428/812 |
| 2002/0028357 A1 | 3/2002 | Shukh et al. | |
| 2004/0038082 A1 | 2/2004 | Tsumori | |
| 2004/0184176 A1 * | 9/2004 | Shimazaki et al. | 360/59 |
| 2005/0118460 A1 * | 6/2005 | Kawano et al. | 428/694 TR |

FOREIGN PATENT DOCUMENTS

| | | |
|---|---|---|
| JP | 58-166531 A | 10/1983 |
| JP | 6-103553 A | 4/1994 |
| JP | 2001-093139 A | 4/2001 |
| JP | 2003-132515 A | 5/2003 |
| JP | 2003-203326 A | 7/2003 |
| JP | 2004-146033 A | 5/2004 |
| JP | 2004-237429 A | 8/2004 |
| WO | 0193286 A1 | 12/2001 |
| WO | WO 2004/019322 A | 3/2004 |

* cited by examiner

PERPENDICULAR MAGNETIC RECORDING MEDIUM, AND PERPENDICULAR MAGNETIC RECORDING AND REPRODUCING APPARATUS

CROSS REFERENCE TO RELATED APPLICATIONS

This application claims the benefit pursuant to 35 U.S.C. §119(e) of the filing date of or Provisional Application 60/669,893, filed on Apr. 11, 2005, the disclosure of which is incorporated herein by reference. Priority is also claimed from Japanese Patent Application No. 2005-100020, filed Mar. 30, 2005, the disclosure of which is incorporated herein by reference.

TECHNICAL FIELD

This invention relates to perpendicular magnetic recording media used in a hard disk apparatus or the like, and a magnetic recording and reproducing apparatus using the perpendicular magnetic recording medium.

BACKGROUND ART

In the perpendicular magnetic recording method, the easy axis of magnetization of the magnetic recording layer, which in conventional media is directed in the plane of the media, is directed in the direction perpendicular to the media; as a result, the demagnetizing field in the vicinity of the magnetization transition region, which is the boundary between recorded bits, is decreased, so that the higher the recording density, the more magnetostatically stable the recorded state, with improved resistance to thermal fluctuations; hence the method is appropriate for increasing areal densities.

When a soft magnetic underlayer, consisting of a soft magnetic material, is provided between the substrate and the perpendicular magnetic recording layer, the functions of so-called perpendicular double-layer media are obtained, and excellent recording performance can be obtained. At this time, the soft magnetic underlayer serves to provide a return path for the recording magnetic field from the magnetic head, and can improve the recording and reproduction efficiency.

In general, perpendicular magnetic recording media are configured with a soft magnetic underlayer provided on a substrate, on which are formed, in order, a non-magnetic underlayer which directs the easy axis of magnetization of the magnetic layer to be perpendicular to the plane of the substrate, a perpendicular magnetic recording layer consisting of a Co alloy, and a protective layer. However, in recent years, the WATE (for Wide Area Track Erasure, or Wide Adjacent Track Erasure) phenomenon has come to be recognized as a problem in perpendicular magnetic recording media. The WATE phenomenon is a problem specific to perpendicular magnetic recording media, and is a phenomenon in which, when a signal is recorded in a particular track, signals are demagnetized over a broad area extending for several μm from the recorded track. Methods for alleviating the problem, mainly through the structure or magnetic anisotropy of the soft magnetic underlayer, have been proposed (see for example Patent Reference Document 1).

It is also known that aligning the direction of easy axis of magnetization of the soft magnetic underlayer in the substrate radial direction is effective for solving the above problem. The following methods are proposed for realizing this magnetic structure;

1) depositing the soft magnetic underlayer under a magnetic field in the radial direction
2) stacking a soft magnetic layer and an antiferromagnetic film as a soft magnetic underlayer (see for example Patent Reference Document 2 and Patent Reference Document 3).

An example of a magnetic recording medium using a similar alloy constitution to this invention is proposed (see Patent Reference Document 4). However, this example is a longitudinal magnetic recording medium and the film thickness of a CoIr layer is thin.

The use of Ir in the soft magnetic underlayer is known but a perpendicular recording medium uses a porous material which is filled with a functional material (see Patent Reference Document 5). A perpendicular recording medium which uses Ir as a dividing layer between soft magnetic layers is known (see Patent Reference Document 6).

Patent Reference Document 1: Japanese Unexamined Patent Application, First Publication No. S58-166531
Patent Reference Document 2: Japanese Unexamined Patent Application, First Publication No. H06-103553
Patent Reference Document 3: US 2002/0028357
Patent Reference Document 4: Japanese Unexamined Patent Application, First Publication Number 2003-132515
Patent Reference Document 5: Japanese Unexamined Patent Application, First Publication Number 2004-237429
Patent Reference Document 6: Japanese Unexamined Patent Application, First Publication Number 2003-203326

DISCLOSURE OF INVENTION

When the SUL (soft magnetic underlayer) of perpendicular magnetic recording media is deposited, there exist the following problems.

(1) It is difficult to control the magnetic field uniformly in the entire radial direction.

(2) The magnetic field is smaller in the inner diameter portion of the substrate.

As media sizes will continue to be smaller in the future, (2) becomes a serious problem.

As described above, when a soft magnetic underlayer with simple film structure is used, it is very difficult to form easy axes of magnetization uniformly in the radial direction. This problem needs to be solved to invent a magnetic recording medium which is easy to produce.

In addition, even if the easy axis of magnetization is controlled as above by various methods, the WATE phenomenon occurs because of some perpendicular magnetization component remains in the SUL.

This invention was devised in light of the above circumstances, and has as an object the provision of perpendicular magnetic recording media enabling recording and reproduction of information at high densities, and a method of manufacturing a magnetic recording and reproducing apparatus for such media, by studying functions of magnetic anisotropy in the soft magnetic underlayer in depth.

In order to resolve the above problems, the following inventions are provided:

(1) A first invention to resolve the above problems is a perpendicular recording medium having at least a soft magnetic underlayer and a perpendicular magnetic recording layer on a non-magnetic substrate, wherein when $Ku\perp$ (erg/cm$^3$) is defined as a perpendicular magnetic anisotropic energy, and Ms (emu/cm$^3$) is defined as a saturation magnetization of the soft magnetic underlayer, $Ku\perp$ of the soft magnetic underlayer has a negative value and $Ku\perp=-2\pi Ms^2+Ku^{grain}<0$.

(2) A second invention to resolve the above problems is a perpendicular recording medium described in (1) above, wherein when $Ku^{grain}$ is defined as a uniaxial crystal magnetic anisotropy energy, the soft magnetic underlayer comprises a material which has negative $Ku^{grain}$, and a hard axis of magnetization of the soft magnetic underlayer is perpendicular to a substrate surface plane.

(3) A third invention to resolve the above problems is a perpendicular recording medium described in (1) or (2) above, wherein the soft magnetic underlayer comprises CoIr alloy as a main component.

(4) A fourth invention to resolve the above problems is a perpendicular recording medium described in any one among (1) to (3) above, wherein a content of Ir in the CoIr alloy of the soft magnetic underlayer is from 5 at. % to 30 at. %.

(5) A fifth invention to resolve the above problems is a perpendicular recording medium described in any one among (1) to (4) above, further comprising a crystalline underlayer whose hexagonal close-packed plane or cubic plane of the crystal is parallel to the substrate surface plane.

(6) A sixth invention to resolve the above problems is a perpendicular magnetic recording media described in any one among (1) to (5) above, wherein the non-magnetic substrate is a disc-shaped substrate with a diameter of 28 mm or less.

(7) A seventh invention to resolve the above problems is a magnetic recording and reproducing apparatus, comprising the perpendicular magnetic recording medium described in any one among (1) to (6) above, and a magnetic head to record information onto and reproduce information from the perpendicular magnetic recording medium.

BEST MODE FOR CARRYING OUT THE INVENTION

This invention uses a material which has a negative $Ku^{grain}$ (a crystal magnetic anisotropic energy) in the axis perpendicular to the substrate surface for the SUL. For example, CoIr alloy is such a material. When a CoIr crystalline structure is a hexagonal close-packed crystal (hcp), its $Ku^{grain}$ in the C axis has a negative value.

When the C axis of the material which has a negative $Ku^{grain}$ in the C axis, is perpendicular to the substrate surface plane, the material is strongly magnetized in a direction parallel to the substrate surface plane. Therefore, when $Ku\perp$ is a perpendicular magnetic anisotropic energy of a soft magnetic underlayer, $Ku\perp$ ($=-2\pi Ms^2+Ku^{grain}$) is smaller than that of a conventional soft magnetic underlayer. The substrate surface is magnetized more strongly in an axis parallel to the substrate surface, so that the possibility of occurrence of a WATE phenomenon decreases significantly due to the magnetization component perpendicular to the surface suppressed significantly.

The following is a detailed explanation.

As stated above, it is quite important in a perpendicular recording medium to control magnetic anisotropy and the direction of the easy axis of the SUL. Especially, in order to suppress the WATE (the Wide Area/Adjacent Track Erasure) phenomenon and so-called the spike noise which is related to the movement of the magnetic domain of the soft magnetic layer, it is necessary not only to orient the easy axis of magnetization in the substrate surface plane, but also to provide a ferromagnetic layer (called a pinning layer) under the SUL to impede the movement of the domain walls of the soft magnetic layer.

This invention has an objective to solve the problems which originate from the SUL of perpendicular recording media, by selecting the soft magnetic material appropriately.

Figure 1:
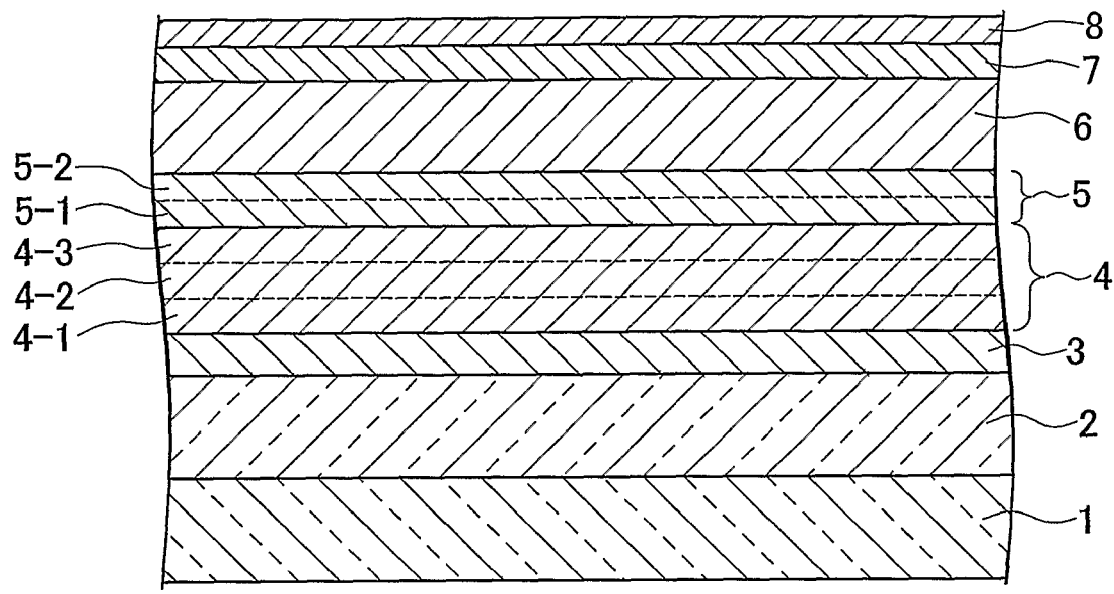
FIG. 1 is a cross-sectional view of perpendicular magnetic recording media of the invention.

FIG. 1 shows an example of a first aspect of perpendicular magnetic recording media 10 of this invention. The perpendicular magnetic recording media 10 shown here is configured by forming, in order on a non-magnetic substrate 1, a pinning layer 2, a non-magnetic underlayer 3, a SUL 4, as well as an crystalline orientation control layer 5, perpendicular magnetic recording layer 6, protective layer 7, and lubrication layer 8.

As the non-magnetic substrate, a metal substrate consisting of a metal material such as aluminum or an aluminum alloy may be used, or, a nonmetallic substrate, consisting of a nonmetallic material such as glass, ceramic, silicon, silicon carbide, carbon, or similar, may be used.

Glass substrates include amorphous glass or crystallized glass; as amorphous glass, soda lime glass or alumino-silicate glass can be used. As crystallized glass, lithium-containing crystallized glass can be used.

As the non-magnetic substrate, a glass substrate or silicon substrate are particularly preferable.

It is desirable that the non-magnetic substrate 1 have an average surface roughness Ra of 0.8 nm or less, and preferably 0.5 nm or less, from the standpoint of high-density recording using a low flying-height recording head.

It is desirable that surface waviness Wa to be 0.3 nm or less, and preferably 0.25 nm or less, from the standpoint of high-density recording using a low flying-height recording head.

It is preferable that, after texturing treatment, the average surface roughness Ra of the substrate be 0.1 nm or greater and 0.8 nm or less. If under 0.1 nm, the effect of texturing treatment is insufficient and the magnetic anisotropy of the SUL deviates. This situation is undesirable. A roughness exceeding 0.8 nm is undesirable since the low flying height of the magnetic head cannot be achieved. And SNR is reduced by the degradation of the magnetic orientation of the perpendicular magnetic recording layer.

In this invention, a pinning layer and/or a non-magnetic underlayer can be used, but, there is no influence on the effect of the invention without these layers. In this invention, it is necessary that $Ku^{grain}$ of the SUL has a negative value. When CoIr is used as a soft magnetic layer material, it is necessary to make the C axis of hcp CoIr crystal perpendicular to the substrate surface plane. An underlayer is sometimes provided to control crystal orientation. In this case, usually, the underlayer has also an hcp crystal structure, such as Ti and Ru.

We found that it is suitable for $Ku^{grain}$ of SUL to have a negative value in the axis perpendicular to the substrate surface plane.

The method for determining $Ku^{grain}$ is shown below.

A perpendicular magnetic anisotropic energy, $Ku\perp$, is estimated by extrapolation for $2\theta$ components of the toque to the saturation field. The toque curve is obtained by rotating the magnetic field in the plane perpendicular to the substrate surface plane of the coupon sample.

$Ku^{grain}$ is calculated using the relationship $Ku\perp=-2\pi Ms^2+Ku^{grain}$ (Ms: saturation magnetization), for a SUL in which the C axis of the uniaxial crystal magnetic anisotropy is perpendicular to the substrate surface plane.

It is known that a film sample has a strong demagnetizing field perpendicular to the film plane, and at that time $Ku\perp$ is expressed as $-2\pi Ms^2$. This invention has an objective to provide a SUL such that X has a negative value if $Ku\perp$ is expressed $-2\pi Ms^2+X$.

In the case of a conventional SUL, X usually has a small positive value due to defects and impurities. In this invention, large $|Ku\perp|$ forces the magnetization to be directed to the surface by making X a negative number. In addition, the fluctuation of the magnetization by environmental field can be decreased because an energy state becomes more stable when making the direction of magnetization in the substrate surface plane.

When $Ku\perp$ has a negative value, the magnetization state of the material in the substrate surface plane is the most stable energy state. Therefore, such a kind of soft magnetic layer will magnetize itself in the substrate surface without a special effort.

As stated above, the inventors invented that a CoIr alloy is quite suitable as a SUL material of a perpendicular recording medium.

When a CoIr alloy has the Ir content 5 at. % or greater, its $Ku\perp$ will take a negative value in the C axial direction of the CoIr alloy. However, it is necessary to control the Ir content because the saturation magnetization Ms decreases as the Ir content increases.

The substrate temperature range during deposition of the CoIr layer is preferably from room temperature to 400° C.

It is preferable that the coercive force Hc of the soft magnetic layers be 30 (Oe) or less, and a value of 10 (Oe) or less is still more preferable. One Oersted is equal to approximately 79 A/m.

It is preferable that the saturation magnetic flux density Bs of the soft magnetic layers be 0.6 T or higher, and a value of 1 T or higher is still more preferable.

It is preferable that the total layer thickness of the soft magnetic layers be 20 nm or greater but 120 nm or less, and still more preferable that the thickness be 20 nm or greater but 100 nm or less, and still more preferable that the thickness be 20 nm or greater but 60 nm or less.

In addition, it was found that a critical film thickness of SUL is dependent upon the Ir content. The critical film thickness is the film thickness in which the magnetization domain wall structure changes from Neel structure to Bloch structure. In other words, when a Ir content is in a range from 5 to 20 at. %, the magnetic domain wall changes from Neel to Bloch at the critical thickness with increasing the thickness of the CoIr alloy. It is known that Neel structure is preferable to impede the WATE phenomenon, however, Bloch structure is preferable for reducing the medium noise. It is necessary to consider the above facts in designing the film thickness.

As the method of formation of the soft magnetic layers, a sputtering method can be used.

The SUL may be a sandwich structure composed of soft magnetic layers, and a Ru or Re interlayer. Both of the soft magnetic layers can be coupled antiferromagnetically by designing the thickness of soft magnetic layers and the Ru or Re interlayer. In this case the film thickness of the Ru or the Re is usually 0.3 nm to 1.5 nm, or preferably 0.5 nm to 1.2 nm. The above constitution can impede the WATE phenomenon, which is the problem peculiar to a perpendicular magnetic medium.

The crystalline orientation control layer is for controlling the crystal structure and grain size of the perpendicular recording layer. A preferable structure of the material used in the crystalline orientation control layer is an hcp structure or a face-centered cubic structure (fcc structure), for example, such as Pt, Pd, NiCr, NiFeCr and Mg or the like. When a structure other than hcp and fcc structures, for example, a body center cubic structure (bcc structure) or amorphous structure, is used, the orientation of the perpendicular magnetic recording layer becomes insufficient. As a result, it causes a decrease of SNR and coercivity, which is not desirable.

The crystalline orientation control layer 5 is formed from a seed layer 5-1 and an intermediate layer 5-2. Pd is preferable as the material of the seed layer 5-1 for example. Ru is preferable as the material of the intermediate layer 5-2. It is preferable that the thickness of crystalline orientation control layer 5 be 30 nm or less. If the thickness of the underlayer (crystalline orientation control layer) exceeds 30 nm, the distance between the magnetic head and the SUL 4 during recording and reproduction is increased, so that the overwrite (OW) characteristic and reproduced signal resolution are degraded, which is undesirable.

The easy axis of magnetization of the perpendicular magnetic recording layer 6 is directed in the direction perpendicular to the plane of the non-magnetic substrate 1. As the constituent elements, at least Co, Pt, and an oxide are included; and Cr, B, Cu, Ta, or Zr can be added in order to improve the SNR characteristic or for other reasons.

Examples of oxides for use in the perpendicular magnetic recording layer 6 include $SiO_2$, $SiO$, $Cr_2O_3$, $CoO$, $Ta_2O_3$, and $TiO_2$. It is preferable that the volume fraction of oxides be from 15 to 40 volume percent. If the volume fraction of oxides is less than 15 volume percent, the SNR characteristic is inadequate, which is undesirable. If the volume fraction exceeds 40 volume percent, the coercive force necessary for high-density recording cannot be obtained, which is undesirable.

In addition, other types of materials, such as Co/Pt and Co/Pd multilayer, ordered alloy such as FePt and FePd, and RE-TM alloy and the like, can be used as the perpendicular recording medium material.

It is preferable that the nucleation field (−Hn) of the perpendicular magnetic recording layer be 1.5 (kOe) or greater. If the nucleation field (−Hn) is less than 1.5 (kOe), thermal fluctuations occur, which is undesirable.

It is preferable that the thickness of the perpendicular magnetic recording layer be from 6 to 18 nm. If the thickness of the perpendicular magnetic recording layer is in this range, sufficient output and good overwrite (OW) characteristic are achieved.

The perpendicular magnetic recording layer can have a single-layer structure, or can have a structure of two or more layers consisting of materials with different compositions.

The protective layer is provided to prevent corrosion of the perpendicular magnetic recording layer and to prevent damage to the media surface upon contact of the magnetic head with the media; conventional materials, such as for example materials containing C, $SiO_2$ or $ZrO_2$, can be used. It is preferable that the thickness of the protective layer be 1 nm or more and 5 nm or less, from the standpoint of reducing the distance between the magnetic head and media to enable high-density recording.

As the lubrication layer, it is preferable that conventional materials, such as for example perfluoro-polyether, an alcohol fluoride, carboxylic acid fluoride, or similar, be used.

Figure 2:
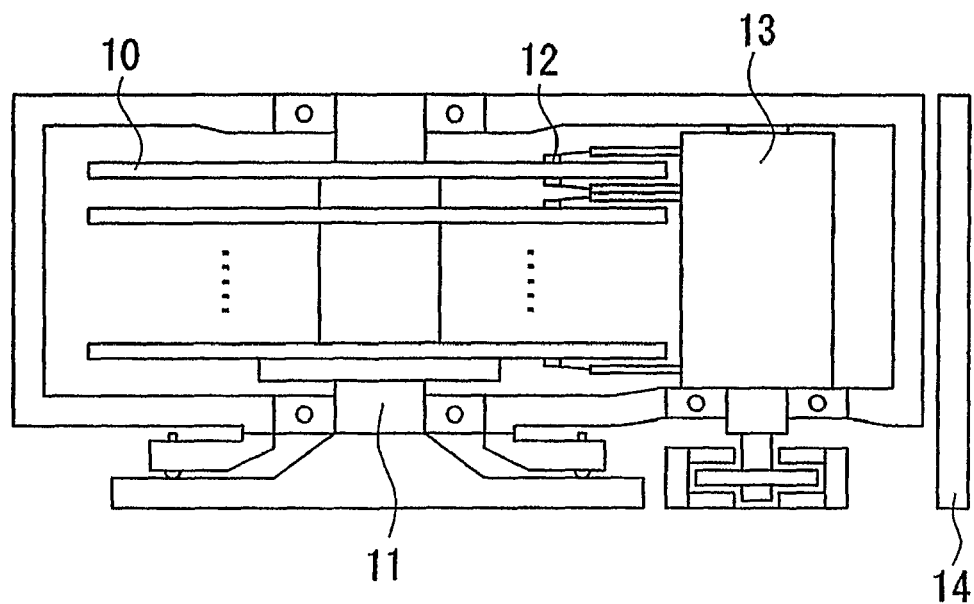
FIG. 2 shows an example of the configuration of a magnetic recording and reproducing apparatus of the invention.

FIG. 2 shows an example of a magnetic recording and reproducing apparatus using the above perpendicular magnetic recording medium 10. The magnetic recording and reproducing apparatus shown here is provided with the perpendicular magnetic recording medium 10, a spindle motor 11 which drives rotation of the perpendicular magnetic recording media 10, magnetic heads 12 to record and reproduce information to and from the perpendicular magnetic recording media 10, a head actuator 13, and a recording and reproducing signal processing system 14. The recording and reproducing signal processing system 14 can process input data and send recording signals to the magnetic heads 12, and can process reproduced signals from the magnetic heads 12 and output data.

EXAMPLES AND COMPARISON EXAMPLES

Below, the action and advantageous results of this invention are clarified through Examples. However, this invention is not limited to the following Examples.

5Zr-4Nb were deposited to form the stacked soft magnetic underlayer on the same substrate as that of Example 1.

On the soft magnetic underlayer 6 nm of a Pd seed layer, 20 nm of an Ru intermediate layer, 10 nm of a CoCrPt—$SiO_2$ magnetic recording layer, and 5 nm of a C protective layer were deposited.

Then, a lubrication layer of perfluoro-polyether was dip-coated, and then the perpendicular magnetic recording media was obtained. These samples were prepared as Comparison Example.

WATE measurements were performed for Examples and Comparison Examples. The method of evaluation was as follows.

1) A basic pattern was recorded at 156 kfci throughout the area of ±6 μm.

2) The average output for each track was measured over all tracks, and was taken to be the track profile in the initial state.

3) A 937 kfci signal was recorded repeatedly 10,000 times on one track in the center of the area.

4) The track profile was once again measured, and the result was compared with the initial state.

Figure 3A:
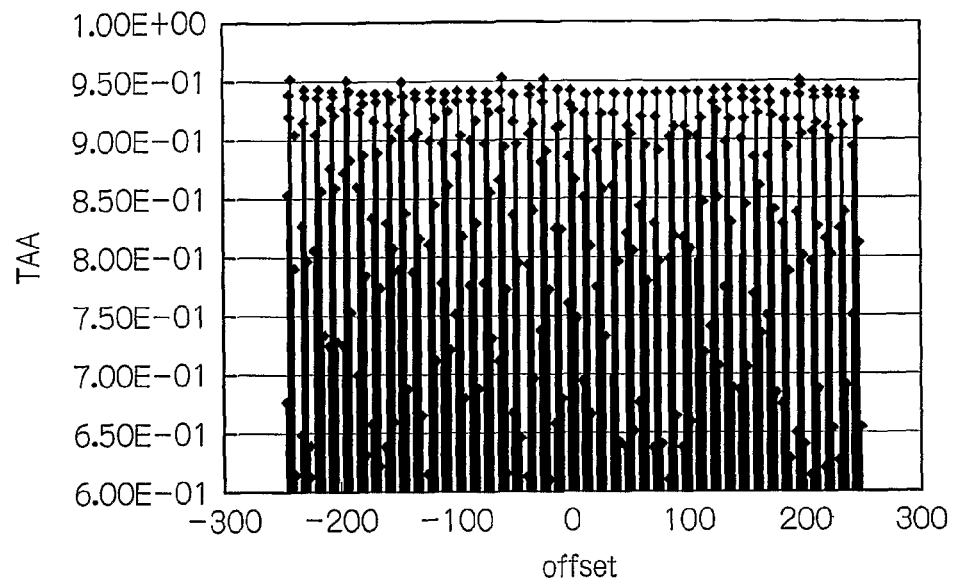
FIG. 3A shows track profiles in an initial state in Example 1.
Figure 3B:
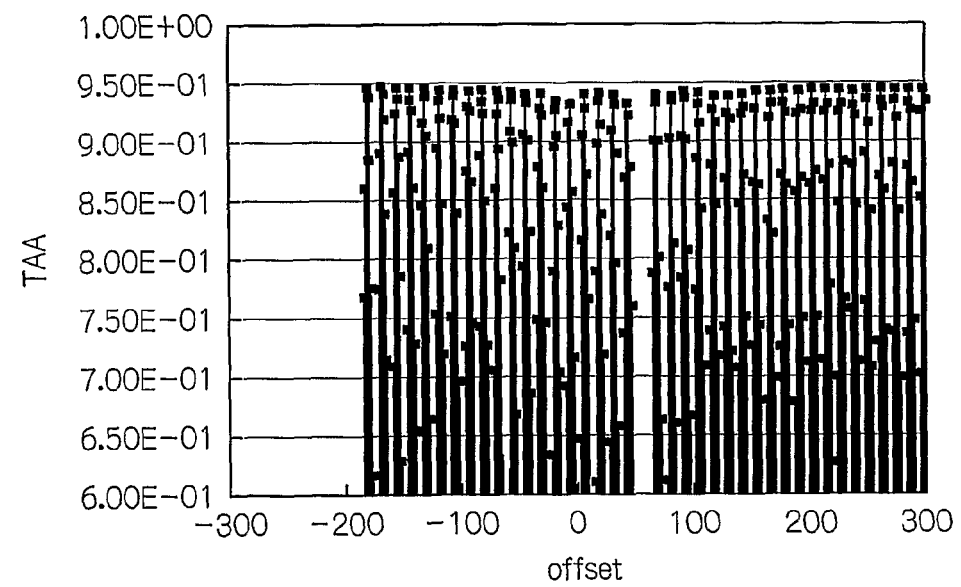
FIG. 3B shows track profiles in a state after 10000 times recording in Example 1.
Figure 4A:
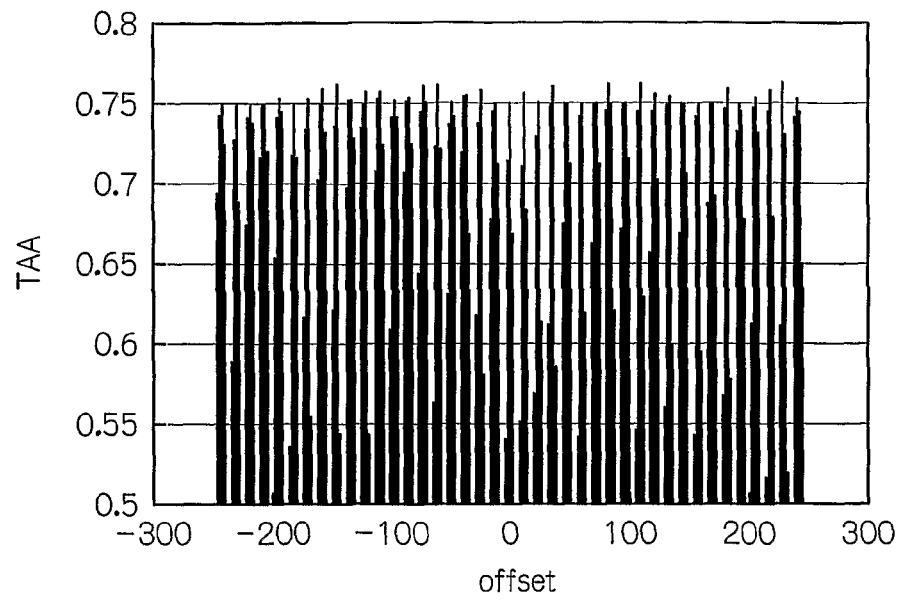
FIG. 4A shows track profiles in an initial state in Comparison Example 1.
Figure 4B:
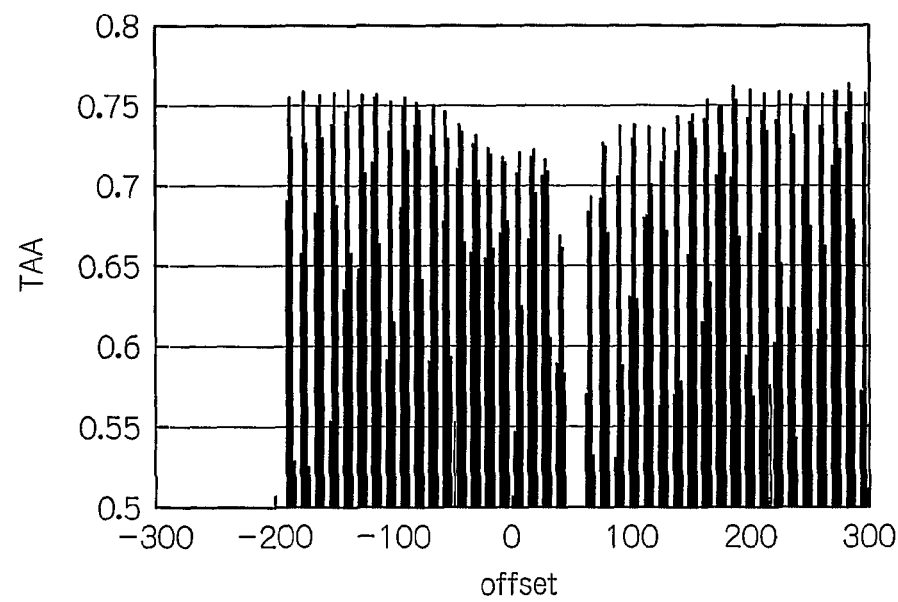
FIG. 4B shows track profiles in a state after 10000 times recording in Comparison Example 1.

The track profiles obtained in this way are shown in FIG. 3 and FIG. 4.

In addition, the crystal magnetic anisotropic energy $Ku^{grain}$ for the C axis, output reduction in tracking profile, the vertical magnetic anisotropic $Ku\perp$ and value of $-2\pi Ms^2$ are respectively shown in Table 1.

As shown in Table 1, in the perpendicular recording media of the invention, it is clear that there is an effect of suppressing the WATE phenomenon.

TABLE 1

| | Underlayer | Soft magnetic underlayer (at. %) | Crystal structure of soft magnetic underlayer | $Ku^{grain}$ ($10^6$ erg/cm$^3$) | $Ku\perp$ ($10^6$ erg/cm$^3$) | $-2\pi Ms^2$ ($10^6$ erg/cm$^3$) | Output reduction (%) | Track profile |
|---|---|---|---|---|---|---|---|---|
| Example 1 | Ti(7 nm)/Ru(3 nm) | 88Co—12Ir | hcp | −4.8 | −10.6 | −5.8 | 0 | FIG. 3 |
| Comparison Example 1 | none | 91Co—5Zr—4Nb | amorphous | 0.3 | −4.8 | −5.1 | 12 | FIG. 4 |

Example 1

After washing the glass substrate (crystallized substrate TS10-SX, diameter 2.5 inches, manufactured by Ohara Inc.), the glass substrate was placed in the film deposition chamber of a DC magnetron sputtering system (Anelva Corp. model C-3010), and the film deposition chamber was evacuated to a background pressure of $1 \times 10^{-5}$ Pa. On this glass substrate 7 nm of a Ti layer was deposited. Then 3 nm of Ru, and 20 nm of 88Co-12Ir (Co content 88 at. %, Ir content 12 at. %) were deposited, to form a SUL with a double-layers structure.

On this sample 6 nm of a Pd seed layer, 20 nm of a Ru intermediate layer, 10 nm of a CoCrPt—$SiO_2$ magnetic recording layer, and 5 nm of a C protective layer were deposited by sputtering method. Then, a dipping method was used to form a lubrication layer of perfluoro-polyether, to obtain the perpendicular magnetic recording media.

Comparison Example 1

A 60 nm 91Co-5Zr-4Nb (Co content 91 at. %, Zr content 5 at. %, Nb content 4 at. %), a 0.8 nm Ru, and a 60 nm 91Co-

Examples 2 to 6, Comparison Examples 2 to 6

Figure 5A:
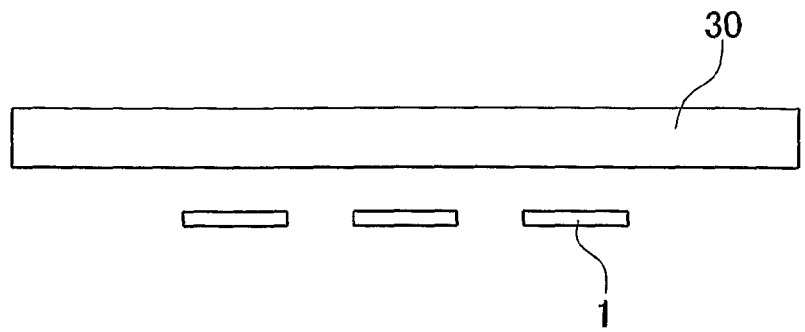
FIG. 5A shows a side view of placement of target and substrate.
Figure 5B:
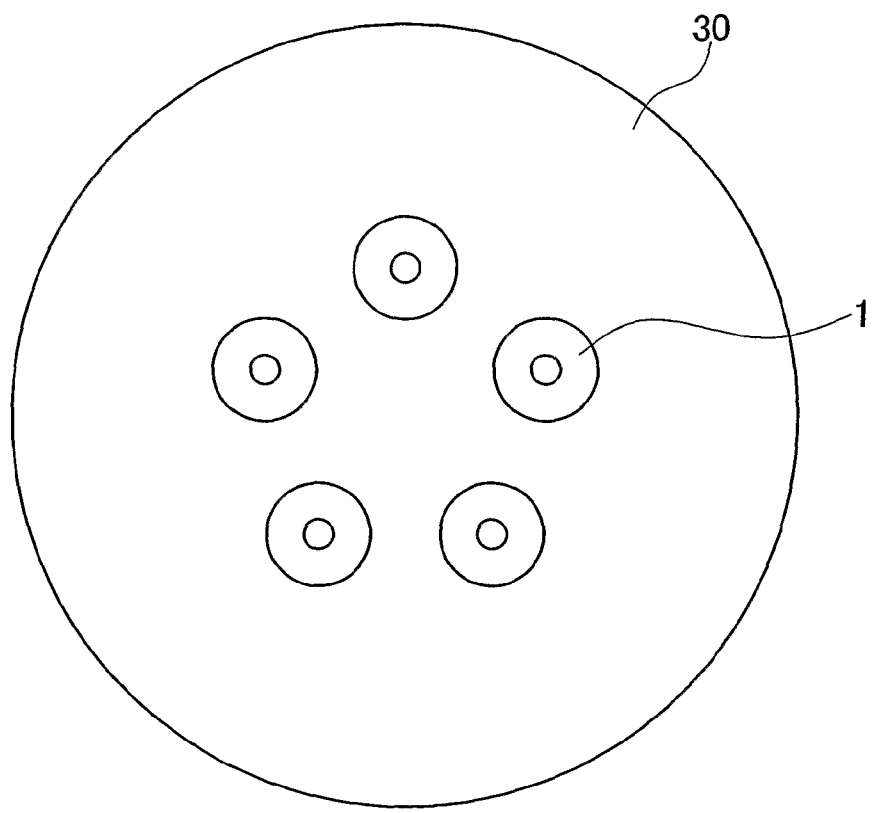
FIG. 5B shows a top view of placement of target and substrate.

Next, a perpendicular recording medium similar to that for Example 1 and Comparison Example 1 was prepared, using a silicon substrate of radius 22 mm as a substrate. In the depositing process, 5 pieces of substrate were subjected to film deposition simultaneously. Five pieces of sample were prepared by the same process as in Example 1 and the other 5 pieces of sample by the same process as in Comparison Example 1. The arrangement of the substrates during the deposition process is shown in FIG. 5.

Examples 2 to 6 were similar to Example 1 and Comparison Examples 2 to 6 were similar to Comparison Example 1.

WATE measurements which are the same as those in Example 1 and Comparison Example 1 were performed for the above samples. The dependence of the WATE phenomena on the positions of the substrates was also estimated. The results are shown in Table 2.

TABLE 2

| | Underlayer | Soft magnetic underlayer (at. %) | Crystal structure of soft magnetic underlayer | $Ku^{grain}$ ($10^6$ erg/cm$^3$) | $Ku^\perp$ ($10^6$ erg/cm$^3$) | $-2\pi Ms^2$ ($10^6$ erg/cm$^3$) | Output reduction (%) |
|---|---|---|---|---|---|---|---|
| Example 2 | Ti(7 nm)/ Ru(3 nm) | 88Co—12Ir | hcp | −4.2 | −10.5 | −6.3 | 0 |
| Example 3 | | | | −4.9 | −11.0 | −6.1 | 0 |
| Example 4 | | | | −4.8 | −10.8 | −6.0 | 0 |
| Example 5 | | | | −4.8 | −10.7 | −5.9 | 0 |
| Example 6 | | | | −4.8 | −10.9 | −6.1 | 0 |
| Comparison Example 2 | none | 91Co—5Zr—4Nb | amorphous | 0.4 | −4.8 | −5.2 | 12 |
| Comparison Example 3 | | | | 0.5 | −4.7 | −5.3 | 10 |
| Comparison Example 4 | | | | 0.6 | −4.6 | −5.2 | 13 |
| Comparison Example 5 | | | | 0.4 | −4.7 | −5.1 | 14 |
| Comparison Example 6 | | | | 0.4 | −4.7 | −5.1 | 10 |

As shown in Table 2, no WATE phenomenon was observed, regardless of the position of the substrates in Examples 2 to 6 of this invention. The result suggests that the easy axis of magnetization can be strongly directed in the substrate plane, regardless of strength, and the direction of the external magnetic field from sputtering guns.

On the other hand, in Comparison Examples, not only was the WATE phenomenon observed, but also its extent depended on the substrate position. This is because the soft magnetic properties of the SUL were dependent upon the magnetic field from the magnetron gun and the spattered particle incidence angle from the target and the like.

Example 7

A special vacuum chamber of the magnetron sputtering system (Anelva Corp. model C-3010) which has two rotatable targets was used for co-sputtering experiment of two different materials on the crystallized glass substrates. The chamber was evacuated to a background pressure $1 \times 10^{-5}$ Pa. As two target materials, a pure Co and a pure Ir were used.

First, the crystallized glass substrate was heated to 350° C. using a lamp heater. Next, a Ti film of 7 nm and a Ru film of 3 nm were deposited in order, and then a $Co_{100-x}Ir_x$ film of 20 nm was deposited, by rotating targets of Co and Ir in the same chamber. The x in $Co_{100-x}Ir_x$ film was adjusted by changing the discharge power to the targets Furthermore, the C protective layer was deposited as the uppermost layer of the sample.

The crystal magnetic anisotropic energy $Ku^{grain}$ of the $Co_{100-x}Ir_x$ films with various constitutions were measured. The aforementioned type of torque magnetometer was used for the measurement. In addition, the film composition obtained by adjustment of discharge output of the two targets was measured by fluorescent X-ray analysis. The results are shown in Table 3. Furthermore, two Ar partial pressures of 3.0 Pa and 0.6 Pa were used during deposition of $Co_{100-x}Ir_x$ film.

TABLE 3

| | | $Ku^{grain}$ ($10^6$ erg/cm$^3$) | |
|---|---|---|---|
| | Ir Content (at. %) | Partial pressure 1: 3.0 Pa | Partial pressure 2: 0.6 Pa |
| Example 7 | 0.0 | 3.0 | 2.6 |
| | 4.0 | — | 2.0 |
| | 7.0 | −1.0 | — |
| | 8.5 | — | −1.9 |
| | 14.0 | −5.0 | — |
| | 17.0 | — | −3.0 |
| | 20.0 | −5.2 | −2.0 |
| | 27.0 | −3.4 | — |

Figure 6:
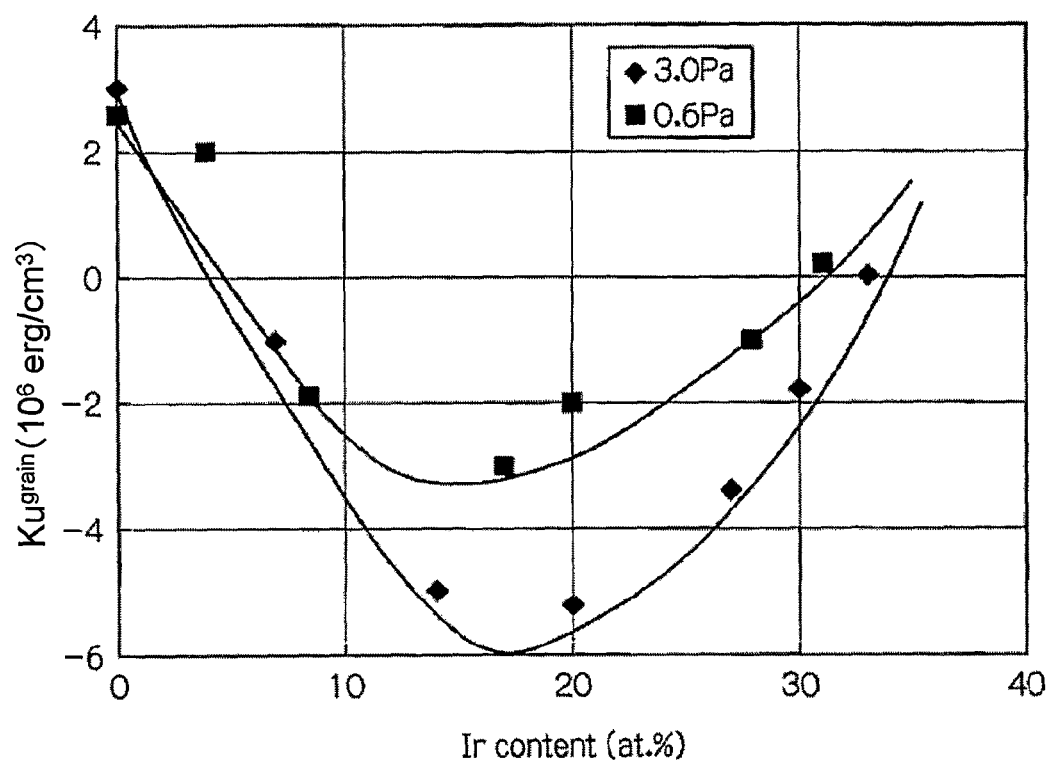
FIG. 6 shows the relationship of Ir content and the $Ku^{grain}$ in Example 7.

The relationship between Ir content and $Ku^{grain}$ is shown in FIG. 6 on the basis of the results in Table 3.

In this invention, it is necessary for $Ku^{grain}$ to have a negative value. The value of $Ku^{grain}$ shows different behavior according to the Ar partial pressure of deposition, but a content of Ir in the range of 5 at. % to 30 at. % is the most suitable on the basis of the above-mentioned results.

Examples 8 to 12, Comparison Examples 8 to 12

On five types of substrates with different diameters, perpendicular recording media were formed by the same methods as those in Example 1 and Comparison Example 1. Then their WATE characteristics were measured.

Five types of substrates with diameters of 95 mm (Example 8), 65 mm (Example 9), 48 mm (Example 10), 28 mm (Example 11) and 22 mm (Example 12) were used, and four samples per type were made. As the material of the SUL, CoIr was used in Examples 8 to 12, and Co—Zr—Nb was used in Comparison Examples 8 to 12. The measurement results are shown in Table 4.

TABLE 4

| | Soft magnetic underlayer | Substrate size (mm φ) | $Ku^{grain}$ ($10^6$ erg/cm$^3$) | $Ku\perp$ ($10^6$ erg/cm$^3$) | $-2\pi Ms^2$ ($10^6$ erg/cm$^3$) | Average WATE reduction (%) | Difference of Average WATE reductions (Comp. Example X − Example X) (%) |
|---|---|---|---|---|---|---|---|
| Example 8 | Co—Ir | 95 | −4.4 | −10.7 | −6.3 | 3 | 10 |
| Example 9 | | 65 | −4.8 | −10.8 | −6.0 | 2 | 12 |
| Example 10 | | 48 | −4.9 | −10.8 | −5.9 | 0 | 14 |
| Example 11 | | 28 | −4.7 | −10.7 | −6.0 | 0 | 21 |
| Example 12 | | 22 | −4.8 | −11.0 | −6.2 | 0 | 29 |
| Comparison Example 8 | Co—Zr—Nb | 95 | 0.3 | −4.8 | −5.1 | 13 | |
| Comparison Example 9 | | 65 | 0.5 | −4.6 | −5.1 | 14 | |
| Comparison Example 10 | | 48 | 0.4 | −4.8 | −5.2 | 14 | |
| Comparison Example 11 | | 28 | 0.4 | −4.7 | −5.1 | 21 | |
| Comparison Example 12 | | 22 | 0.3 | −4.7 | −5.0 | 29 | |

When Co—Zr—Nb is used as the material of the SUL, the WATE phenomenon of the medium with a smaller diameter became more noticeable. Therefore, the effect of this invention is significant for a substrate with a size below the diameter of 28 mm.

INDUSTRIAL APPLICABILITY

In accordance with this invention, it is possible to provide a perpendicular recording medium in which the easy axis of a magnetization of a soft magnetic underlayer is oriented in the substrate surface plane, which is effective to suppress the WATE phenomena and spike noise and the like.

The invention claimed is:

1. A perpendicular recording medium having at least a soft magnetic underlayer a crystalline orientation control layer, and a perpendicular magnetic recording layer on a non-magnetic substrate, wherein the crystalline orientation control layer is a non-magnetic layer and is formed between the soft magnetic underlayer and the perpendicular magnetic recording layer,
   wherein
   when $Ku\perp$ (erg/cm$^3$) is defined as a perpendicular magnetic anisotropic energy and Ms (emu/cm$^3$) is defined as a saturation magnetization of the soft magnetic underlayer,
   $Ku\perp$ of the soft magnetic underlayer has a negative value and $Ku\perp < -2\pi Ms^2$;
   when $Ku^{grain}$ is defined as a crystal magnetic anisotropy energy, the soft magnetic underlayer comprises a material which has a negative $Ku^{grain}$, and a hard axis of magnetization of the soft magnetic underlayer is perpendicular to a substrate surface plane and
   the soft magnetic underlayer comprises CoIr alloy as a main component.

2. A perpendicular recording medium according to claim 1, wherein a content of Ir in the CoIr alloy of the soft magnetic underlayer is from 5 at. % to 30 at. %.

3. A perpendicular recording medium according to claim 1, further comprising a non-magnetic hexagonal close-packed underlayer between the non-magnetic substrate and the soft magnetic underlayer.

4. A perpendicular magnetic recording media according to claim 1, wherein the non-magnetic substrate is a disc-shaped substrate with a diameter of 28 mm or less.

5. A magnetic recording and reproducing apparatus, comprising
   the perpendicular magnetic recording media according to claim 1, and
   a magnetic head to record information onto and reproduce information from the perpendicular magnetic recording media.

6. A magnetic recording and reproducing apparatus, comprising
   the perpendicular magnetic recording media according to claim 2, and
   a magnetic head to record information onto and reproduce information from the perpendicular magnetic recording media.

7. A magnetic recording and reproducing apparatus, comprising
   the perpendicular magnetic recording media according to claim 3, and
   a magnetic head to record information onto and reproduce information from the perpendicular magnetic recording media.

8. A magnetic recording and reproducing apparatus, comprising
   the perpendicular magnetic recording media according to claim 4, and
   a magnetic head to record information onto and reproduce information from the perpendicular magnetic recording media.

* * * * *